United States Patent
Hodge

(10) Patent No.: US 10,288,157 B2
(45) Date of Patent: May 14, 2019

(54) TORQUE CONVERTER INCLUDING INTEGRAL FRONT COVER FLUID FLOW BAFFLES

(71) Applicant: Schaeffler Technologies AG & Co. KG, Herzogenaurach (DE)

(72) Inventor: Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 202 days.

(21) Appl. No.: 15/245,961

(22) Filed: Aug. 24, 2016

(65) Prior Publication Data

US 2018/0058558 A1   Mar. 1, 2018

(51) Int. Cl.
*F16H 41/24* (2006.01)
*F16H 41/28* (2006.01)

(52) U.S. Cl.
CPC ............. *F16H 41/24* (2013.01); *F16H 41/28* (2013.01); *F16H 2041/243* (2013.01)

(58) Field of Classification Search
CPC ........................ F16H 41/28; F16H 2041/243
See application file for complete search history.

(56) References Cited

U.S. PATENT DOCUMENTS

| | | | | |
|---|---|---|---|---|
| 4,697,417 A * | 10/1987 | Billet | ...................... | F16H 41/24 192/212 |
| 6,688,441 B1 * | 2/2004 | Arhab | ..................... | F16H 45/02 192/3.29 |
| 6,691,542 B2 * | 2/2004 | Fukukawa | ............. | B21D 53/28 72/84 |
| 7,757,828 B2 * | 7/2010 | Sturgin | .................. | F16H 45/02 192/3.29 |
| 8,327,636 B2 | 12/2012 | Karamavruc et al. | | |
| 8,789,669 B2 | 7/2014 | Karamavruc et al. | | |
| 2009/0078522 A1 * | 3/2009 | Jung | ...................... | F16H 45/02 192/3.29 |

* cited by examiner

*Primary Examiner* — F Daniel Lopez
(74) *Attorney, Agent, or Firm* — Davidson, Davidson & Kappel, LLC

(57) ABSTRACT

A torque converter is provided. The torque converter includes a rear cover and a front cover. The rear cover includes a rear radially extending section and a rear axially extending section extending axially from an outer radial end of the rear radially extending section. The front cover includes a front radially extending section and a front axially extending section extending axially from an outer radial end of the front radially extending section. The front cover includes a plurality of baffles formed as part of the front cover and bent radially inward from the front axially extending section. A method of forming a torque converter is also provided.

17 Claims, 2 Drawing Sheets

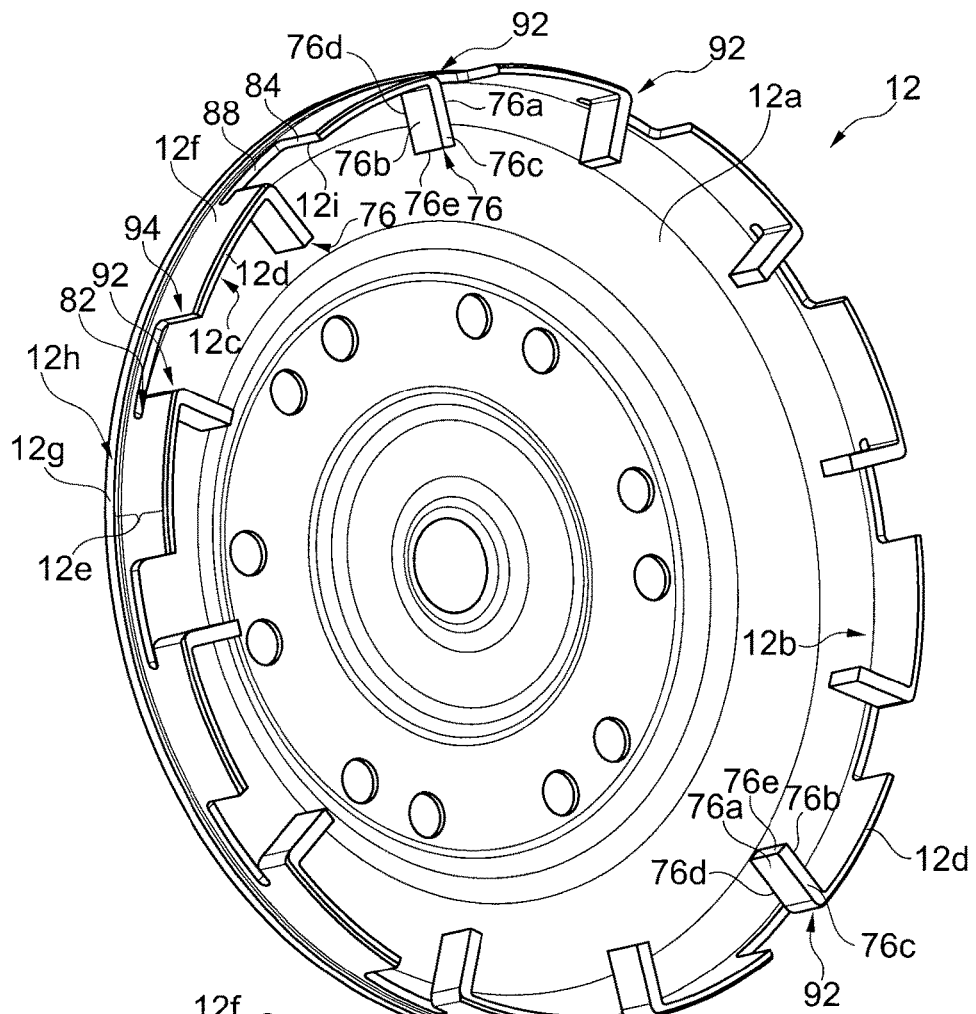
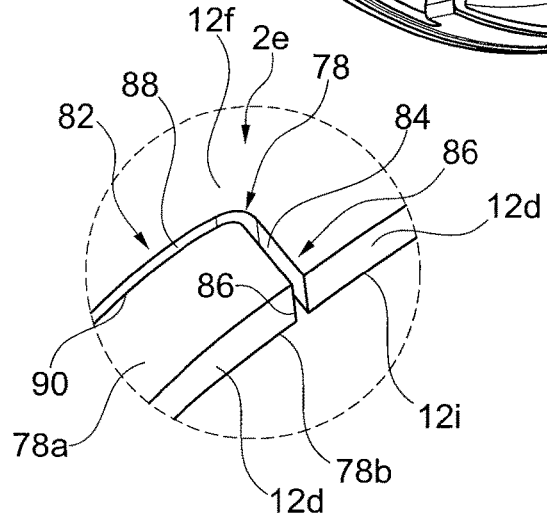
Fig. 2
Fig. 3

TORQUE CONVERTER INCLUDING INTEGRAL FRONT COVER FLUID FLOW BAFFLES

The present disclosure relates generally to torque converters and more specifically to the fluid flow baffles in torque converters.

BACKGROUND

U.S. Pat. No. 8,327,636 discloses a torque converter including a front cover having blades for increasing a fluid flow toward or away from a clutch pack. U.S. Pat. No. 8,789,669 discloses torque converter drive plates that include at least one protrusion for disrupting a Coriolis Effect on fluid in the torque converter.

SUMMARY OF THE INVENTION

A torque converter is provided. The torque converter includes a rear cover and a front cover. The rear cover includes a rear radially extending section and a rear axially extending section extending axially from an outer radial end of the rear radially extending section. The front cover includes a front radially extending section and a front axially extending section extending axially from an outer radial end of the front radially extending section. The front cover includes a plurality of baffles formed as part of the front cover and bent radially inward from the front axially extending section.

A method of forming a torque converter is also provided. The method includes cutting a plurality of tabs in a front axially extending section of a front cover; bending the tabs radially inward to form baffles; and fixing the front axially extending section to the rear axially extending section.

BRIEF DESCRIPTION OF THE DRAWINGS

The present invention is described below by reference to the following drawings, in which:

FIG. 2 shows a perspective view of the front cover; and

FIG. 3 shows a perspective view of a tab formed before it is bent radially inward to form a baffle.

DETAILED DESCRIPTION

Figure 1:
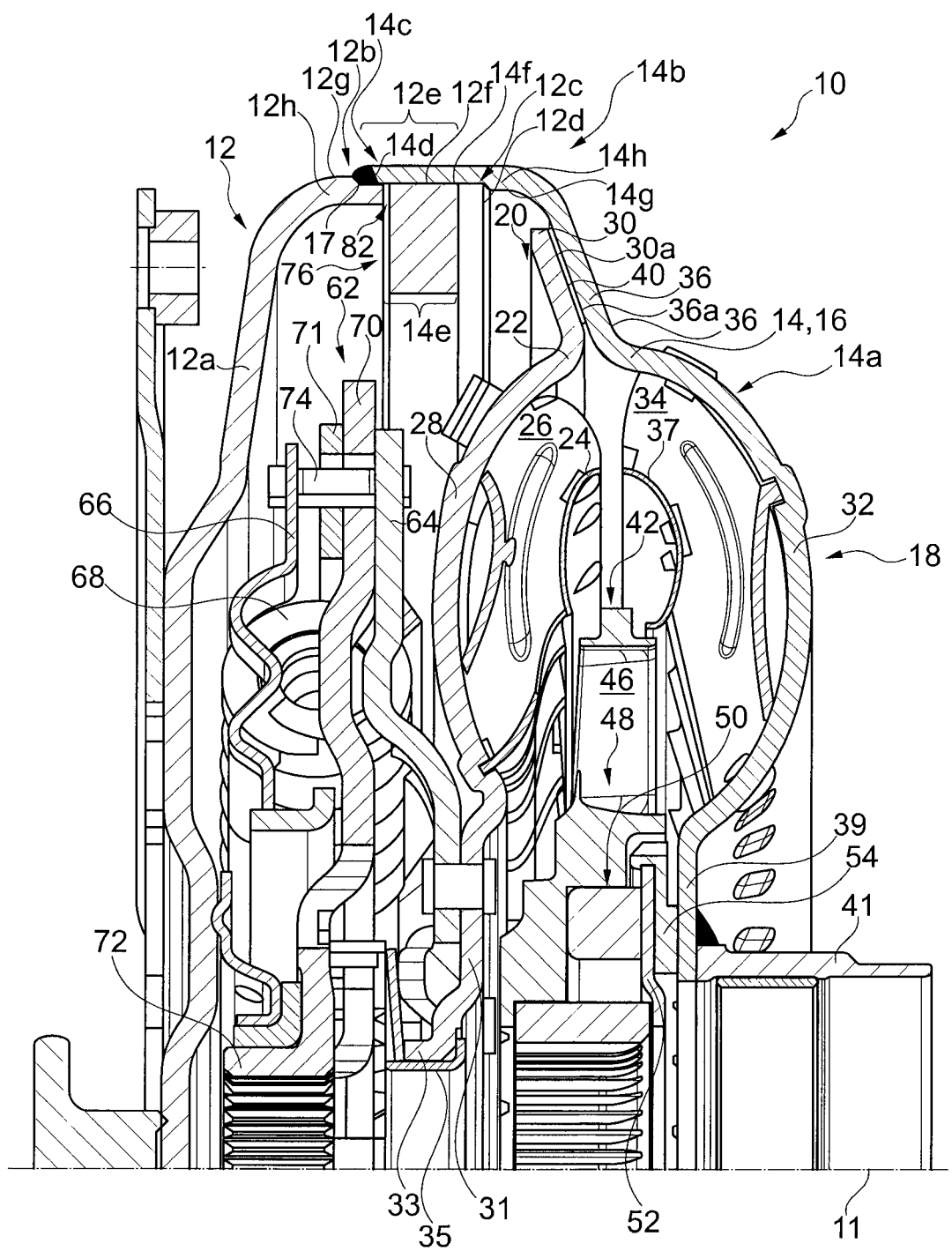
FIG. 1 shows a cross-sectional side view of a torque converter including a front cover having baffles according to an embodiment of the present invention.

The disclosure provides front cover baffles to improve response time after coast engagement in a torque converter including an axially movable turbine piston. The baffles are formed in the cover itself during stamping. Baffles are positioned to allow continuous closure weld thus not compromising use of the front cover as containment vessel. Using a cam die, for example, to pierce and form baffle into cover eliminates the need for additional parts and attachment processes.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11.

FIG. 2 shows a perspective view of front cover 12. Referring to FIGS. 1 and 2 together, front cover 12 is substantially cup-shaped and includes a radially extending section 12a that intersects and extends radially away from center axis 11 and an annular axially extending section 12b that protrudes axially at an outer circumference of section 12a. A rim section 12c, which begins at an axially rearmost rim 12d of section 12b, is stepped radially inward to define a thinned section 12e having an outer circumferential surface 12f that is offset radially inward from an outer circumferential surface 12g of a remaining section, i.e., a thicker section 12h, of section 12b. Rear cover 14 is similarly cup-shaped and includes a radially extending section 14a that forms impeller shell 16 and an annular axially extending section 14b that protrudes axially at an outer circumference of radially extending section 14a. A rim section 14c, which begins at an axially rearmost rim 14d of section 14b, is stepped radially outward to define a thinned section 14e having an inner circumferential surface 14f that is offset radially outward from an inner circumferential surface 14g of a remaining section, i.e., a thicker section 14h, of section 14b. Covers 12, 14 are arranged with respect to each other such that sections 12e, 14e overlap each other, with section 12e being received inside of section 14e and outer circumferential surface 12f contacting inner circumferential surface 14f. A weld 17 is provided at rim 14d and outer circumferential surface 12f of thinned section 12d to fix front cover 12 and rear cover 14 together.

Referring solely back to FIG. 1, torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16, at radially extending section 14a of rear cover 14, includes a rounded blade supporting portion 32, which is shaped as an annular bowl, for contacting transmission side edges of impeller blades 34. Radially outside of blade supporting portion 32, radially extending section 14a includes a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes a stator casting including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52.

A damper assembly 62 is positioned between front cover 12 and turbine 20 and is configured for transferring torque from turbine 20 to a transmission input shaft. Damper assembly 62 includes two cover plates—a turbine side cover plate 64, which is riveted to turbine 20, and a front cover side cover plate 66. Cover plates 64, 66 support a set of arc springs 68 axially therebetween. Damper assembly 62 also includes two drive flanges 70, 71 positioned axially between cover plates 64, 66. Drive flange 70 includes an inner radial hub 72 configured for nonrotatably connecting to a transmission input shaft. Drive flanges 70, 71 both includes circumferentially extending slots for receiving springs 68. Radially outside of springs 68, cover plates 64, 66 are fixed together by a plurality of circumferentially spaced rivets 74.

Referring to FIGS. 1 and 2 together, in accordance with an embodiment of the invention, torque converter 10 is provided with a plurality of circumferentially spaced baffles 76 connected to front cover 12. Baffles 76 are rectangular in shape and each extends radially inward from thinned section 12e of axially extending section 12b of front cover 12. Baffles 76 are formed integrally with front cover 12 as a single piece. Each baffle 76 is formed by piercing axially extending section 12b of front cover 12 during the stamping of front cover 12 to form a tab 78 (FIG. 3), then the tab 78 is bent radially inward to form the baffle 76.

Referring to FIG. 3, the piercing results in an axially extending slot 80 extending axially from rim 12d into axially extending section 12b and a circumferentially extending slot 82 extending circumferentially from a front end of axially extending slot 80. Axially extending slot 80 is delimited on one side by an axially extending edge 84 of thinned section 12d, which extends radially from outer circumferential surface 12f to an inner circumferential surface 12i of thinned section 12e, and on another side by an axially extending edge 86 of tab 78, which extends radially from outer circumferential surface 78a of tab 78 to an inner circumferential surface 78b of tab 78. Circumferentially extending slot 82 is delimited on one side by a circumferentially extending edge 88 of thinned section 12e, which extends radially from outer circumferential surface 12f to an inner circumferential surface 12i of thinned section 12e, and on another side by a circumferentially extending edge 90 of tab 78, which extends radially from outer circumferential surface 78a of tab 78 to an inner circumferential surface 78b of tab 78.

Referring to FIGS. 2 and 3 together, after slots 80, 82 are cut into axially extending section 12b of front cover 12 to form tabs 78, tabs 78 are bent radially inward to form baffles 76 extending radially inward from axially extending section 12b toward center axis 11. Axially extending section 12b transitions to each baffle 76 at a respective bend 92, with outer circumferential surface 12f transitioning to a first planar circumferentially facing and radially extending face 76a of the respective baffle 76 at bend 92 and inner circumferential surface 12i transitioning to a second planar circumferentially facing and radially extending face 76b of the respective baffle 76 at bend 92. Rim 12d also transitions into a first axially facing and radially extending edge 76c of each baffle 76, which extend together in the same plane, while circumferentially extending edge 90 of each tab 78 forms a second axially facing and radially extending edge 76d of the respective baffle 76 after the bending of tabs 78 to form baffles 76. Additionally, after the bending, each axially extending edge 86 of tab 78 forms an axially extending and radially facing edge 76e delimited by radially inner ends of faces 76a, 76b and edges 76c, 76, with edge 76e defining a radially innermost edge of the respective baffle 76. In this embodiment, faces 76a, 76b have the same width as each other and are substantially wider than edges 76c, 76d, 76e, which have a same width as each other.

The bending of tabs 78 radially inward results in a plurality of circumferentially spaced notches 94 being formed in thinned section 12e of axially extending section 12b. Each of the baffles 76 extends radially from a respective one of the notches 94 and each baffle 76 has the same shape as the respective notch. Each of notches 94 is delimited by bend 92, a respective axially extending edge 84 and a respective axially extending edge 88. In this embodiment, an end portion of each circumferentially extending slot 82 remains in axially extending section 12b, with the remaining portion of each slot 82 extending circumferentially from the respective notch 94.

Referring to FIGS. 1 to 3 together, after tabs 78 are cut into front cover 12 and bent radially inward to form baffles 76, thinned section 12e of axially extending section 12b of front cover 12 is axially slid into axially extending section 12b of rear cover 14 such that thinned section 12e overlaps with thinned section 14e and outer circumferential surface 12f contacts inner circumferential surface 14f. Front cover 12 is positioned with respect to rear cover 14 such that axially extending section 14b of rear cover covers notches 94 and the remaining portions of circumferentially extending slots 82. Rear cover 14 is then welded to front cover 12, with a continuous weld 17 being formed to fix covers 12, 14 together and prevent fluid from leaking out of covers 12, 14 via notches 94 and slots 82.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
    a rear cover, the rear cover including a rear radially extending section and a rear axially extending section extending axially from an outer radial end of the rear radially extending section; and
    a front cover, the front cover including a front radially extending section and a front axially extending section extending axially from an outer radial end of the front radially extending section, the front cover including a plurality of baffles formed as part of the front cover and bent radially inward from the front axially extending section, the front axially extending section including a plurality of circumferentially spaced notches each defined by a notch edge, each of the baffles extending radially from a respective one of the notch edges, each of the baffles including two planar circumferentially facing and radially extending faces and two axially facing and radially extending edges, the planar circumferentially facing and radially extending faces being wider than the axially facing and radially extending edges, the rear axially extending section covering the notches.

2. The torque converter as recited in claim 1 wherein each baffle has the same shape as the respective notch.

3. The torque converter as recited in claim 1 further comprising a weld fixing the rear axially extending section and the front axially extending section together.

4. The torque converter as recited in claim 3 wherein the weld contacts a rim of the rear axially extending section and an outer circumferential surface of the front axially extending section.

5. The torque converter as recited in claim 1 wherein the rear axially extending section includes a rear thinned section and the front axially extending section includes a front thinned section, the front thinned section including the notches, the rear thinned section covering the notches.

6. The torque converter as recited in claim 1 wherein each of the baffles further includes an axially extending and radially facing edge delimited by radially inner ends of the planar circumferentially facing and radially extending faces and the axially facing and radially extending edges, the axially extending and radially facing edge defining a radially innermost edge of the respective baffle.

7. A method of forming a torque converter comprising:
cutting a plurality of tabs in a front axially extending section of a front cover;
bending the tabs radially inward and circumferentially to form baffles; and
fixing the front axially extending section to a rear axially extending section of a rear cover.

8. The method as recited in claim 7 wherein the bending defines a plurality of bends each connecting one of the baffles to the front axially extending section, the bending forming a plurality of circumferentially spaced notches in the front axially extending section.

9. The method as recited in claim 8 wherein the cutting of each of the tabs includes forming an axially extending slot extending axially from a rim of the front axially extending section and a circumferentially extending slot extending circumferentially from the axially extending slot, each notch being delimited by one of the bends, one of the axially extending slots and one of the circumferentially extending slots.

10. The method as recited in claim 9 wherein each baffle has the same shape as the respective notch.

11. The method as recited in claim 9 further comprising axially sliding the front axially extending section into the rear axially extending section of the rear cover such that the rear axially extending section covers the notches.

12. The method as recited in claim 11 wherein the rear axially extending section includes a rear thinned section and the front axially extending section includes a front thinned section, the front thinned section including the notches, the rear thinned section covering the notches.

13. The method as recited in claim 7 wherein the fixing includes welding the rear axially extending section and the front axially extending section together.

14. A torque converter comprising:
a rear cover, the rear cover including a rear radially extending section and a rear axially extending section extending axially from an outer radial end of the rear radially extending section; and
a front cover, the front cover including a front radially extending section and a front axially extending section extending axially from an outer radial end of the front radially extending section, the front cover including a plurality of baffles formed as part of the front cover and bent radially inward from the front axially extending section, the front axially extending section including a plurality of rim sections circumferentially spaced apart by a plurality of circumferentially spaced notches, the rim sections forming an outer circumferential surface of the front axially extending section, each of the baffles extending radially from a respective one of the rim sections, the notches being defined by surfaces extending from the outer circumferential surface of the front axially extending section to an inner circumferential surface of the front axially extending section, each of the notches being defined at the circumferential surface of the front axially extending section by a circumferential edge of one of the rim sections and a circumferential edge of one of the baffles.

15. The torque converter as recited in claim 14 wherein each of the baffles includes two planar circumferentially facing and radially extending faces and two axially facing and radially extending edges, the planar circumferentially facing and radially extending faces being wider than the axially facing and radially extending edges.

16. The torque converter as recited in claim 15 wherein each of the baffles further includes an axially extending and radially facing edge delimited by radially inner ends of the planar circumferentially facing and radially extending faces and the axially facing and radially extending edges, the axially extending and radially facing edge defining a radially innermost edge of the respective baffle.

17. The torque converter as recited in claim 14 wherein the rear axially extending section covers the notches and the rim sections.

* * * * *